(12) United States Patent
Shan

(10) Patent No.: US 10,823,907 B2
(45) Date of Patent: Nov. 3, 2020

(54) BACKLIGHT MODULE AND DISPLAY DEVICE

(71) Applicant: HKC CORPORATION LIMITED, Shenzhen, Guangdong (CN)

(72) Inventor: JianFeng Shan, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/650,504

(22) PCT Filed: Oct. 27, 2017

(86) PCT No.: PCT/CN2017/107981
§ 371 (c)(1),
(2) Date: Mar. 25, 2020

(87) PCT Pub. No.: WO2019/061625
PCT Pub. Date: Apr. 4, 2019

(65) Prior Publication Data
US 2020/0284972 A1 Sep. 10, 2020

(30) Foreign Application Priority Data
Sep. 27, 2017 (CN) .......................... 2017 1 0886267

(51) Int. Cl.
*F21V 8/00* (2006.01)
(52) U.S. Cl.
CPC ........... *G02B 6/0083* (2013.01); *G02B 6/009* (2013.01)

(58) Field of Classification Search
CPC .............................. G02B 6/0083; G02B 6/009
See application file for complete search history.

(56) References Cited

U.S. PATENT DOCUMENTS

| 2003/0071933 A1 | 4/2003 | Ohta et al. |
| 2006/0077533 A1* | 4/2006 | Miles ................... G02B 26/001 359/321 |

(Continued)

FOREIGN PATENT DOCUMENTS

| CN | 101082731 A | 12/2007 |
| CN | 101290429 A | 10/2008 |

(Continued)

*Primary Examiner* — Kevin Quarterman
(74) *Attorney, Agent, or Firm* — Muncy, Geissler, Olds & Lowe, P.C.

(57) ABSTRACT

A backlight module and a display device are provided. A back plate of the backlight module has a first surface and a second surface. The back plate comprises a metal portion and an insulating portion, and electrical connection pads are disposed in the insulating portion. The first and second electrical connection pads are disposed on the first surface and electrically coupled to each other. The third and fourth electrical connection pads are disposed on the second surface. The first electrical connection pad is correspondingly coupled to the third electrical connection pad, and the second electrical connection pad is correspondingly coupled to the fourth electrical connection pad. A driving circuit board comprises a fifth electrical connection pad. The fifth electrical connection pad is correspondingly coupled to the first electrical connection pad. A light emitting unit comprises a sixth electrical connection pad correspondingly coupled to the fourth electrical connection pad.

20 Claims, 3 Drawing Sheets

(56) References Cited

U.S. PATENT DOCUMENTS

| | | | | |
|---|---|---|---|---|
| 2008/0158635 A1* | 7/2008 | Hagood | ............... | G02B 26/00 |
| | | | | 359/230 |
| 2013/0278612 A1* | 10/2013 | Holman | ............... | G02B 6/0031 |
| | | | | 345/501 |
| 2015/0371585 A1* | 12/2015 | Bower | ............... | H01L 33/38 |
| | | | | 345/1.1 |
| 2016/0116799 A1* | 4/2016 | Jang | ............... | H01L 27/1288 |
| | | | | 438/23 |
| 2016/0120030 A1* | 4/2016 | Na | ............... | H05K 1/181 |
| | | | | 362/612 |
| 2017/0034939 A1* | 2/2017 | Fike, III | ............... | H05K 3/30 |
| 2018/0095195 A1* | 4/2018 | Kim | ............... | G02B 5/003 |

FOREIGN PATENT DOCUMENTS

| | | |
|---|---|---|
| CN | 101634441 A | 1/2010 |
| CN | 103277711 A | 9/2013 |
| KR | 10-2008-0001889 A | 1/2008 |

* cited by examiner

BACKLIGHT MODULE AND DISPLAY DEVICE

BACKGROUND

Technical Field

This disclosure relates to a backlight module and a display device, and more particularly to a backlight module and a display device having lower costs.

Related Art

With the advancement of technology, flat panel displays have been widely used in various fields, more particularly the liquid crystal display devices. Because the flat panel display has the superior features including the thin body, the low power consumption, the radiationless property and the like, the flat panel display has gradually replaced the conventional cathode ray tube display device, and has been applied to various electronic products, such as a mobile phone, a portable multimedia device, a notebook computer, a liquid crystal television, a liquid crystal screen and the like.

As the liquid crystal itself does not emit light, a backlight module needs to be provided to provide uniform light rays to the display panel in order to display images. At present, the architecture of the mainstream backlight module is a side-entry backlight module. In the well-known technology, the side-entry backlight module generally comprises components such as a back plate, a reflective sheet, a light emitting diode (LED) light bar, a light guide plate and the like. The back plate carries the reflective sheet, the LED light bar and light guide plate. The LED light bar faces the light guide plate and is disposed on the back plate to output light rays to be incident into the light guide plate. The function of the light guide plate is to guide the transmission direction of the light rays, and the light rays are emitted from the light output surface of the light guide plate through the total reflection of the light guide plate to provide the uniform surface light source to the display panel. In addition, the reflective sheet can reflect the light rays emitted from the bottom surface of the light guide plate to the light guide plate to improve the availability of the light rays.

In the conventional method, the voltage required by the LED light bar is generated after the converter of the driving circuit board boosts the voltage inputted from the system side, and then the boosted voltage is transmitted to the connector of the LED light bar through the connector and the connection wires (such as the flexible printed circuit board) to drive the LED light bar to emit light. However, in the conventional method, not only the materials, such as connectors and connecting wires, having higher costs are required, but also the problems, such as wire folding damage or connector detachment and the like, may occur, and a decrease in reliability of the products is caused.

SUMMARY

An objective of this disclosure is to provide a backlight module and a display device, wherein costs of connectors and connection wires made with conventional methods can be saved, and the problems, such as wire folding damage or connector detachment and the like, can be prevented, so that the product further has the competition ability.

This disclosure provides a backlight module, comprising a display panel, a first electrical connection pad, a second electrical connection pad, a third electrical connection pad and a fourth electrical connection pad, a driving circuit board and a light emitting unit. The back plate has a first surface and a second surface opposite to the first surface; the back plate comprises a metal portion and an insulating portion; and the insulating portion surrounds the periphery of the metal portion. The first electrical connection pad, the second electrical connection pad, the third electrical connection pad and the fourth electrical connection pad are disposed in the insulating portion; the first electrical connection pad and the second electrical connection pad are disposed on the first surface of the back plate and are electrically coupled to each other through the metal portion; the third electrical connection pad and the fourth electrical connection pad are disposed on the second surface of the back plate; the first electrical connection pad is correspondingly coupled to the third electrical connection pad; the second electrical connection pad is correspondingly coupled to the fourth electrical connection pad. The driving circuit board is disposed on the first surface of the back plate, and comprises a fifth electrical connection pad, wherein the fifth electrical connection pad is correspondingly coupled to the first electrical connection pad. The light emitting unit is disposed on the second surface of the back plate, and comprises a sixth electrical connection pad, wherein the sixth electrical connection pad is correspondingly coupled to the fourth electrical connection pad.

This disclosure further provides a backlight module, comprising a display panel and a backlight module. The backlight module is disposed opposite to the display panel and comprises a first electrical connection pad, a second electrical connection pad, a third electrical connection pad and a fourth electrical connection pad, a driving circuit board and a light emitting unit. The back plate has a first surface and a second surface opposite to the first surface; the back plate comprises a metal portion and an insulating portion; and the insulating portion surrounds the periphery of the metal portion. The first electrical connection pad, the second electrical connection pad, the third electrical connection pad and the fourth electrical connection pad are disposed in the insulating portion; the first electrical connection pad and the second electrical connection pad are disposed on the first surface of the back plate and are electrically coupled to each other through the metal portion; the third electrical connection pad and the fourth electrical connection pad are disposed on the second surface of the back plate; the first electrical connection pad is correspondingly coupled to the third electrical connection pad; the second electrical connection pad is correspondingly coupled to the fourth electrical connection pad; the driving circuit board is disposed on the first surface of the back plate, and comprises a fifth electrical connection pad, wherein the fifth electrical connection pad is correspondingly coupled to the first electrical connection pad. The light emitting unit is disposed on the second surface of the back plate, and comprises a sixth electrical connection pad, wherein the sixth electrical connection pad is correspondingly coupled to the fourth electrical connection pad.

In one embodiment, the backlight module further comprises a seventh electrical connection pad disposed on the first surface of the back plate, wherein the back plate is further divided into a grounding portion, the seventh electrical connection pad is disposed in the grounding portion, and the driving circuit board further comprises an eighth electrical connection pad, which is correspondingly coupled to the seventh electrical connection pad and coupled to a ground terminal of the driving circuit board.

In one embodiment, the backlight module further comprises a ninth electrical connection pad disposed on the second surface of the back plate, wherein the back plate is further divided into a grounding portion, the ninth electrical connection pad is disposed in the grounding portion, and the light emitting unit further comprises a tenth electrical connection pad, which is correspondingly coupled to the ninth electrical connection pad, and coupled to a ground terminal of a circuit board of the light emitting unit.

In one embodiment, the back plate is further divided into a grounding portion, and the grounding portion and the metal portion are electrically insulated from each other through the insulating portion.

In one embodiment, the backlight module further comprises an insulating member disposed on the first surface or the second surface of the back plate, and the insulating member covers the metal portion.

In summary, in the backlight module and the display device of this disclosure, the light emitting unit is directly powered by the electrical connection pad corresponding disposed on the back plate of the backlight module, and the metal portion of the back plate. Thus, the costs of the connectors and the connection wires of driving the conventional light emitting unit can be saved, and the problems, such as wire folding damage or connector detachment and the like, can be prevented, so that the backlight module and the display device of this disclosure further has the product competition ability.

BRIEF DESCRIPTION OF THE DRAWINGS

To illustrate the technical solutions according to the embodiments of the present invention more clearly, the accompanying drawings for describing the embodiments are introduced briefly in the following. Apparently, the drawings in the following description are only some embodiments of the present disclosure, those of ordinary skill in the art is concerned, without any creative effort, and may also obtain other drawings based on these drawings.

Figure 1A:
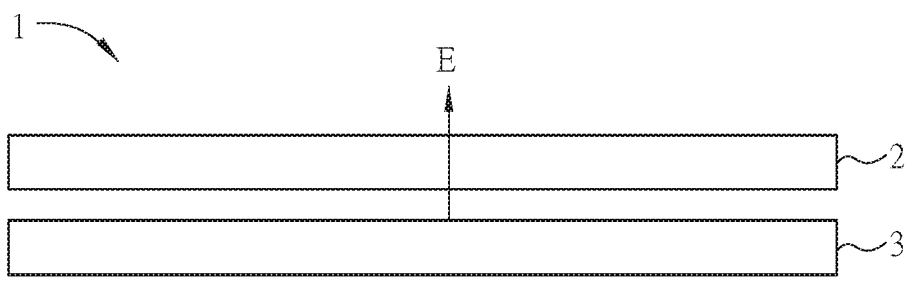
FIG. 1A is a schematic view showing a display device of one embodiment of this disclosure.

The implementation, functional characteristics and advantages of the present disclosure will be further described with reference to the accompanying drawings.

DETAILED DESCRIPTION OF THE INVENTION

In order to make those skilled in the art better understand the technical solution of the present application, in conjunction with the following drawings of the present application example embodiments, the technical solutions in the present application will be clearly and completely described, obviously, the described embodiments are merely part of embodiments of the present application, rather than all embodiments. Based on the embodiments of the present application, all other embodiments of ordinary skill in the art without creative efforts shall be made available, should belong to the scope of the present application.

Incidentally, in the embodiment of the present invention, all embodiments directional indicator (such as up, down, left, right, front, rear) are only for explaining in a particular position (as shown in the drawings) in each member relative positional relationship between the, movement, etc., if the specified position is changed, then the directional indicator will change accordingly.

Further, in the present invention, descriptions related to "first," "second," and the like are described for illustrative purposes only, and not intended to indicate or imply relative importance or technical features specified implicitly indicated quantity. Thus, features being defined as "first", "second" may be explicitly or implicitly include at least one of the feature. In the description of the present invention, the meaning of "plurality" is at least two, e.g. two, three, etc., unless explicitly specifically limited.

In the present invention, unless otherwise explicitly specified or limited, the terms "coupled," "connected," "fixed" and the like are to be broadly understood, for example, "fixed" connector may be fixed, or may be removably coupled or removably connected to, or integrally; may be a mechanical connector may be electrically coupled or connected; may be directly connected, can also be coupled or connected indirectly through intervening structures, it may be interaction between the two internal communicating elements or two elements, unless expressly defined. Those of ordinary skill in the art, to be understood that the specific meanings in the present invention in accordance with specific circumstances.

Furthermore, various embodiments of the present invention the technical solution between the embodiments may be combined with each other, but must be based on those of ordinary skill in the art can be implemented as the basis, when combined with the technical solutions appear contradictory that this should not be achieved or aspect of the present binding does not within the scope of the present disclosure claims.

The backlight module and the display device will be further described in detail with reference to FIGS. 1 to 5, wherein units with similar structure are represented by the same reference numerals.

Figure 1B:
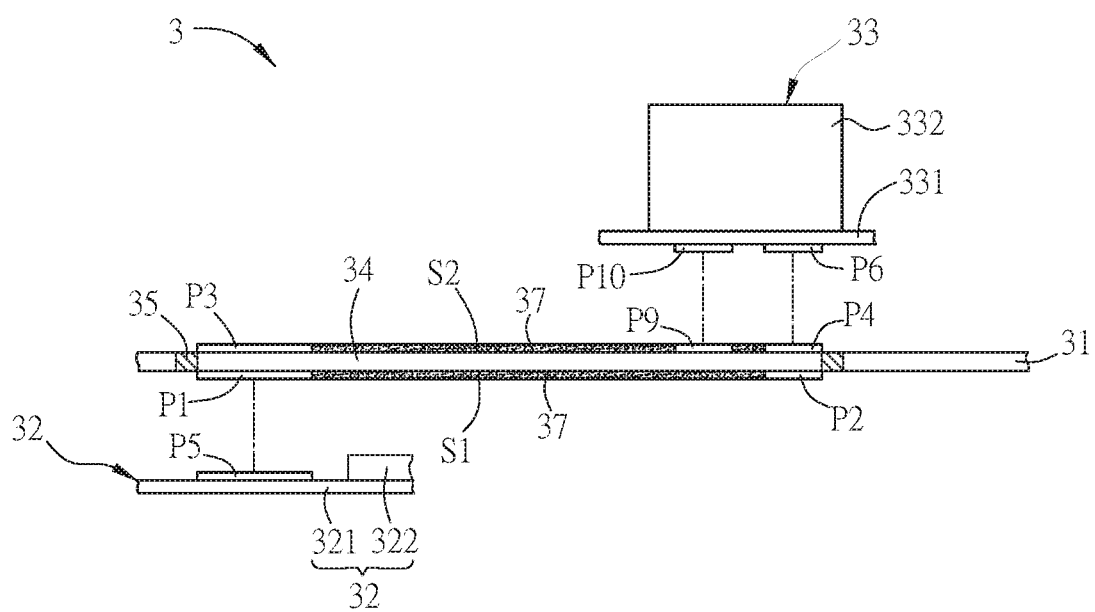
FIG. 1B is a partial schematic side view showing a backlight module of the display device of FIG. 1A.

FIG. 1A is a schematic view showing a display device 1 of one embodiment of this disclosure, and FIG. 1B is a partial schematic side view showing a backlight module 3 of the display device 1 of FIG. 1A.

As shown in FIG. 1A, a display device 1 being a liquid crystal display device comprises a display panel 2 and a backlight module 3. The backlight module 3 is disposed opposite to the display panel 2, and can output light rays E passing through the display panel 2, so that the display panel 2 can display an image. The display panel 2 in this embodiment may be, for example, an in-plane switch (IPS) type liquid crystal display panel, a fringe field switching (FFS) type liquid crystal display panel, a vertical alignment mode (VA mode) liquid crystal display panel, a photo alignment mode (PA mode) liquid crystal display panel or a 3D liquid crystal display panel, or other liquid crystal display panels, and this disclosure is not particularly limited to the types.

Figure 2:
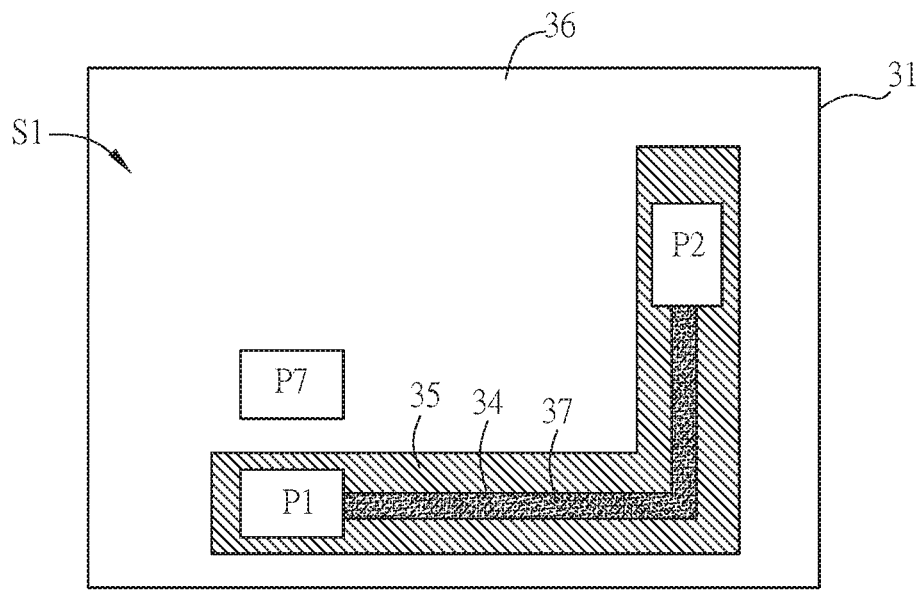
FIG. 2 is a schematic bottom view showing a back plate of the backlight module of FIG. 1B.
Figure 3:
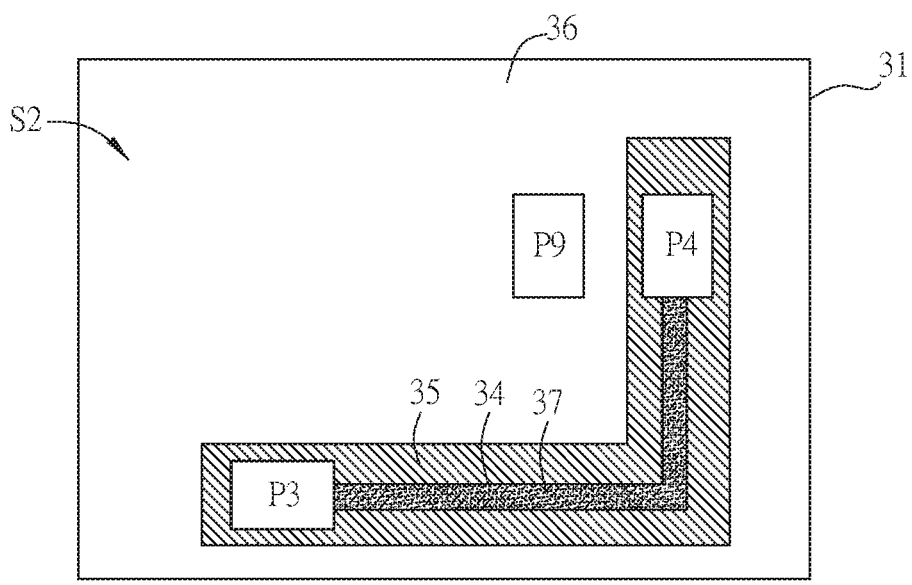
FIG. 3 is a schematic top view showing the back plate of the backlight module of FIG. 1B.

Referring to FIG. 1B in conjunction with FIGS. 2 and 3, wherein the FIG. 2 is a schematic bottom view showing a back plate 3 of the backlight module 31 of FIG. 1B, and FIG. 3 is a schematic top view showing the back plate 3 of the backlight module 31 of FIG. 1B.

The backlight module 3 comprises a display panel 31, a first electrical connection pad P1, a second electrical connection pad P2, a third electrical connection pad P3 and a fourth electrical connection pad P4, a driving circuit board 32 and a light emitting unit 33.

The back plate 31 is used to carry components of the backlight module 3 and the display device 1, and the back plate 31 has a first surface S1 and a second surface S2 opposite to the first surface S1. The display panel 2, a first electrical connection pad P1, a second electrical connection pad P2, a third electrical connection pad P3, and a fourth electrical connection pad P4, a driving circuit board 32 and a light emitting unit 33 may be disposed on the back plate 31. In addition to the above-mentioned components, the backlight module 3 may further comprise other essential components, such as an optical film, a light guide plate, a reflective sheet (not shown) and the like. All of the optical film, the light guide plate, the reflective sheet and the light emitting unit 33 are disposed on a second surface S2 of the back plate 31. The light emitting unit 33 is disposed adjacently to the light guide plate, and can output light rays to be incident into the light guide plate, and emitted from the light output surface thereof. After passing through the optical film and the display panel 2, the light rays are emitted from a display surface of the display panel 2. Herein, the relatively disposed relationships between the optical film, the light guide plate, the reflective sheet, the back plate 31, and the light emitting unit 33 may be found in the prior art, and detailed descriptions thereof will be omitted.

The back plate 31 may be made of a material capable of easily dissipating the heat to dissipate the thermal energy, generated by the display panel 2 or the backlight module 3, to the outside, and its material comprises, a metal or plastic material, for example. The metal material may be, for example, aluminum (AL), stainless steel (SUS) or Galvanized steel (SGLC), but is not limited thereto. The plastic material may be, for example, polycarbonate (PC), acrylonitrile-butadiene-styrene copolymer (ABS), or other insulation materials, and it is also not limited thereto. The back plate 31 in this example embodiment comprises metal and plastic materials. For example, the metal material may be used for electrical conduction and heat dissipation, and the plastic material may be used for insulation.

Specifically speaking, as shown in FIGS. 2 and 3, the back plate 31 in this embodiment can be divided into a metal portion 34 and an insulating portion 35; and the insulating portion 35 surrounds the periphery of the metal portion 34. In addition, the back plate 31 in this embodiment may also be divided into a grounding portion 36, and the grounding portion 36 and a metal portion 34 are electrically insulated by an insulating portion 35. As the name suggests, the metal portion 34 and the grounding portion 36 may be respectively made of the electroconductive metal materials for the electrical conduction, and the grounding portion 36 may be coupled to the ground. In addition, the insulating portion 35 is made of, for example, the insulating plastic material for separating the grounding portion 36 from the metal portion 34. Upon implementation, the insulating plastic material may be embedded into the metal plate to form the back plate 31 having the metal portion 34, the insulating portion 35 and the grounding portion 36.

The first electrical connection pad P1, the second electrical connection pad P2, the third electrical connection pad P3 and the fourth electrical connection pad P4 are disposed in the insulating portion 35, so that the insulating portion 35 may also surround the first electrical connection pad P1, the second electrical connection pad P2, the third electrical connection pad P3 and the fourth electrical connection pad P4. As shown in FIG. 1B, the first electrical connection pad P1 and the second electrical connection pad P2 are disposed on the first surface S1 of the back plate and are electrically coupled to each other through the metal portion 34; and the third electrical connection pad P3 and the fourth electrical connection pad P4 are disposed on the second surface S2 of the back plate 31 and can also be electrically coupled to each other through the metal portion 34.

It is worth noting that in order to avoid the influence on the power supply of the light emitting unit 33, and in order to further protect the apparatus or personnel safety, and the backlight module 3 in this embodiment can further comprises an insulating member 37 disposed on the first surface S1 or the second surface S2 of the back plate 31, and the insulating member 37 can covers the metal portion 34. In addition, an insulating member 37 may be disposed on a first surface S1 and a second surface S2 of the back plate 31 at the same time, and covers the metal portion 34, and even covers the second electrical connection pad P2 to prevent other external objects from touching the metal portion 34 or the second electrical connection pad P2 to affect the power supply.

In addition, the first electrical connection pad P1 is correspondingly coupled to the third electrical connection pad P3, and the second electrical connection pad P2 is correspondingly coupled to the fourth electrical connection pad P4. The "correspondingly coupled to" means that the positions of both of them on the back plate 31 correspond to each other (disposed on the opposite surfaces) and both of them are also (e.g., electrically) coupled to each other by the metal material of the metal portion 34, or electrically coupled to each other by using other electroconductive members (such as the wires), so that the first electrical connection pad P1 is correspondingly and electrically coupled to the third electrical connection pad P3, and the second electrical connection pad P2 is correspondingly and electrically coupled to the fourth electrical connection pad P4. In addition, the backlight module 3 may also comprise a seventh electrical connection pad P7 (FIG. 2), and the seventh electrical connection pad P7 is disposed on the first surface S1 of the back plate 31, and is located in the grounding portion 36. In other words, the seventh electrical connection pad P7 is coupled to the ground. The seventh electrical connection pad P7 and the first electrical connection pad P1 may be disposed in parallel.

The driving circuit board 32 is disposed on the first surface S1 of the back plate 31, and comprises a fifth electrical connection pad P5; wherein the fifth electrical connection pad P5 is correspondingly coupled to the first electrical connection pad P1. In addition, the driving circuit board 32 in this embodiment can further have an eighth electrical connection pad P8 (FIG. 4), a driving circuit 322 and a circuit board 321, and the driving circuit 322, the fifth electrical connection pad P5 and the eighth electrical connection pad P8 are disposed on the circuit board 321. Wherein the driving circuit 322 may comprise, for example, a converter or other essential elements for outputting the drive voltage, and the converter can boost the voltage into the high drive voltage to be outputted.

Figure 4:
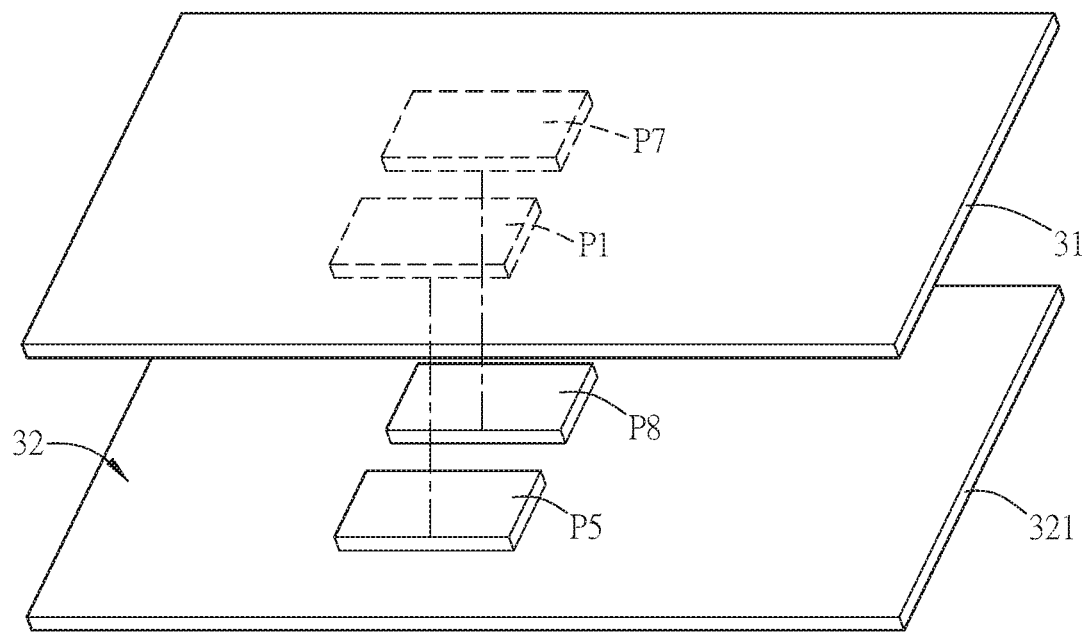
FIG. 4 is a schematic view showing the corresponding connections between a first electrical connection pad and a seventh electrical connection pad on the back plate, and between a fifth electrical connection pad and an eighth electrical connection pad on the circuit board of the driving circuit board of an embodiment.

As shown in FIG. 4, a schematic view showing the corresponding connections between a first electrical connection pad P1 and a seventh electrical connection pad P7 on the back plate 31, and between a fifth electrical connection pad P5 and an eighth electrical connection pad P8 on the circuit board 32 of the driving circuit board 321 of one embodiment. The fifth electrical connection pad P5 is correspondingly coupled to the first electrical connection pad P1, an eighth electrical connection pad P8 is correspondingly coupled to the seventh electrical connection pad P7, and the eighth electrical connection pad P8 may be coupled to the ground terminal (not shown) of the converter of the driving circuit 322, so that the seventh electrical connection pad P7 is also coupled to the ground terminal of the driving circuit board 32.

Referring again to FIG. 1B, the light emitting unit 33 is disposed on the second surface S2 of the back plate 31, and comprises a sixth electrical connection pad P6, wherein the sixth electrical connection pad P6 is correspondingly coupled to the fourth electrical connection pad P4. In addition, the backlight module 3 of this embodiment can further comprises a ninth electrical connection pad P9 disposed on the second surface S2 of the back plate 31, and is located in the grounding portion 36. In other words, the ninth electrical connection pad P9 is coupled to the ground. The ninth electrical connection pad P9 and the fourth electrical connection pad P4 may be disposed in parallel.

In addition, the light emitting unit 33 of this embodiment also comprises a tenth electrical connection pad P10, a circuit board 331 and a light emitting elements 332. The light emitting elements 332, the sixth electrical connection pad P6 and the tenth electrical connection pad P10 are disposed on the circuit board 331. Upon implementation, a circuit board 331 may be a flexible printed circuit board or a rigid circuit board, and the light emitting unit 33 may be a light emitting diode light bar, so that there are multiple light emitting elements 332, the light emitting elements 332 are respectively disposed on the circuit board 331, and each of the light emitting elements 332 is electrically coupled to the corresponding sixth electrical connection pad P6 and tenth electrical connection pad P10, so that the drive voltage can drive the light emitting element 332 to emit light through the sixth electrical connection pad P6 and the tenth electrical connection pad P10. The tenth electrical connection pad P10 may be coupled to the ground terminal of the circuit board 331. Since the ninth electrical connection pad P9 is located inside the grounding portion 36, the ninth electrical connection pad P9 and the tenth electrical connection pad P10 are also coupled to the ground.

Figure 5:
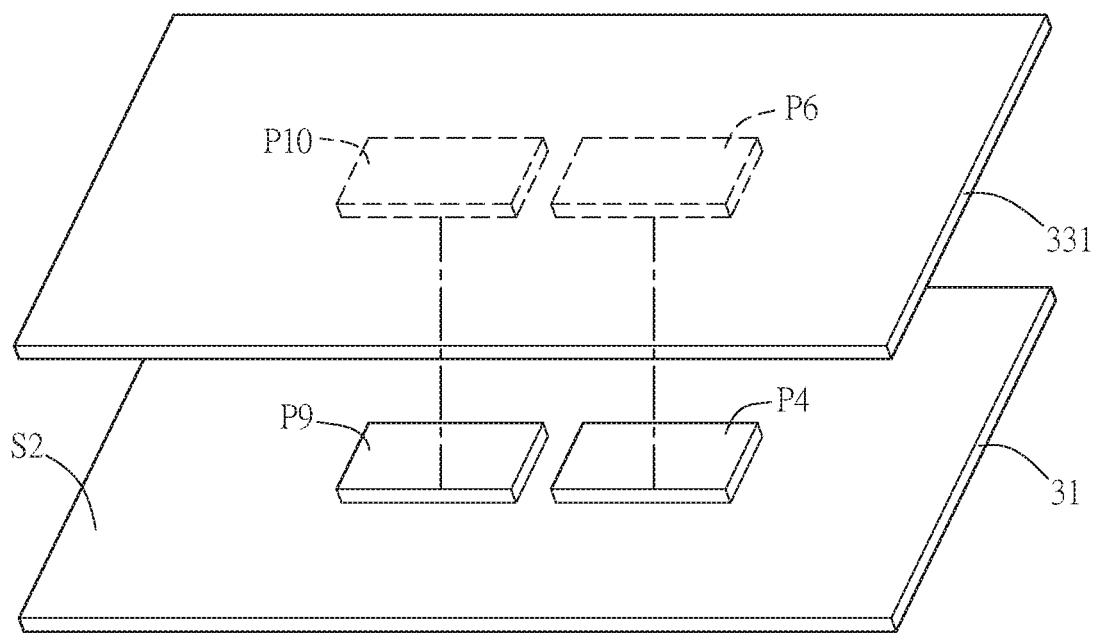
FIG. 5 is a schematic view showing the corresponding connections between a fourth electrical connection pad and a ninth electrical connection pad on the back plate, and between a sixth electrical connection pad and a tenth electrical connection pad on the circuit board of the light emitting unit of an embodiment.

As shown in FIG. 5, a schematic view showing the corresponding connections between a fourth electrical connection pad P4 and a ninth electrical connection pad P9 on the back plate 31, and between a sixth electrical connection pad P6 and a tenth electrical connection pad P10 on the circuit board 331 of the light emitting unit 33 of one embodiment. The sixth electrical connection pad P6 is correspondingly coupled to the fourth electrical connection pad P4, the tenth electrical connection pad P10 is correspondingly coupled to the ninth electrical connection pad P9, and the tenth electrical connection pad P10 may be coupled to the ground terminal of the circuit board 331 (not shown), so that the ninth electrical connection pad P9 can be coupled to the ground terminal of the circuit board 331 of the light emitting unit 33. In addition, the eighth electrical connection pad P8 on a circuit board 321 and the tenth electrical connection pad P10 on the circuit board 331 may also be coupled to the ground of the circuit system, separately.

Referring again to FIG. 1B, in order to increase the electrical conductivity between the fifth electrical connection pad P5 and the first electrical connection pad P1, between the sixth electrical connection pad P6 and the fourth electrical connection pad P4, between the eighth electrical connection pad P8 and the seventh electrical connection pad P7 and between the tenth electrical connection pad P10 and the ninth electrical connection pad P9, and in order to reduce the resistance when the two pads are coupled, electroconductive connectors (not shown) may be further disposed between the fifth electrical connection pad P5 and the first electrical connection pad P1, between the sixth electrical connection pad P6 and the fourth electrical connection pad P4, between the eighth electrical connection pad P8 and the seventh electrical connection pad P7 and between the tenth electrical connection pad P10 and the ninth electrical connection pad P9 to reduce the contact resistance therebetween. The material of the electroconductive connector may be, for example, the electroconductive foam, the conductive adhesive (such as the copper adhesive) or the solder, but is not limited thereto.

Thus, in the practical application, the high drive voltage, after being boosted by the converter of the driving circuit 322 and being outputted to the fifth electrical connection pad P5, may be transmitted to the second electrical connection pad P2 through the fifth electrical connection pad P5, the first electrical connection pad P1 and the metal portion 34 of the back plate 31, and then transmitted to the sixth electrical connection pad P6 through the fourth electrical connection pad P4 to drive the light emitting element 332 to emit light.

In summary, in the backlight module and the display device of this disclosure, the light emitting unit is directly powered by the electrical connection pad corresponding disposed on the back plate of the backlight module, and the metal portion of the back plate. Thus, the costs of the connectors and the connection wires of driving the conventional light emitting unit can be saved, and the problems, such as wire folding damage or connector detachment and the like, can be prevented, so that the backlight module and the display device of this disclosure further has the product competition ability.

The foregoing is only preferred embodiments of the present application only, not intended to limit the present application, any modifications made within the spirit and principle of this application, equivalent replacements and improvements should be included in the present within the scope of the application.

What is claimed is:

1. A backlight module, comprising:
   a back plate having a first surface and a second surface opposite to the first surface, and the back plate comprises a metal portion and an insulating portion, wherein the insulating portion surrounds the periphery of the metal portion;
   a first electrical connection pad, a second electrical connection pad, a third electrical connection pad and a fourth electrical connection pad disposed in the insulating portion, wherein, the first electrical connection pad and the second electrical connection pad are disposed on the first surface of the back plate and are electrically coupled to each other through the metal portion, the third electrical connection pad and the fourth electrical connection pad are disposed on the second surface of the back plate, the first electrical connection pad is correspondingly coupled to the third electrical connection pad, and the second electrical connection pad is correspondingly coupled to the fourth electrical connection pad;
a driving circuit board disposed on the first surface of the back plate and comprises a fifth electrical connection pad, wherein the fifth electrical connection pad is correspondingly coupled to the first electrical connection pad; and
a light emitting unit disposed on the second surface of the back plate and comprises a sixth electrical connection pad, wherein the sixth electrical connection pad is correspondingly coupled to the fourth electrical connection pad.

2. The backlight module according to claim 1, further comprising:
a seventh electrical connection pad disposed on the first surface of the back plate, wherein the back plate further comprises a grounding portion, the seventh electrical connection pad is disposed in the grounding portion, and the driving circuit board further comprises an eighth electrical connection pad which is correspondingly coupled to the seventh electrical connection pad and coupled to a ground terminal of the driving circuit board.

3. The backlight module according to claim 1, further comprising:
a ninth electrical connection pad disposed on the second surface of the back plate, wherein the back plate further comprises a grounding portion, the ninth electrical connection pad is disposed in the grounding portion, and the light emitting unit further comprises a tenth electrical connection pad which is correspondingly coupled to the ninth electrical connection pad and coupled to a ground terminal of a circuit board of the light emitting unit.

4. The backlight module according to claim 1, wherein the insulating portion surrounds the first electrical connection pad, the second electrical connection pad, the third electrical connection pad and the fourth electrical connection pad.

5. The backlight module according to claim 1, wherein the third electrical connection pad and the fourth electrical connection pad are electrically coupled to each other through the metal portion.

6. The backlight module according to claim 1, wherein the back plate further comprises a grounding portion, and the grounding portion and the metal portion are electrically insulated from each other through the insulating portion.

7. The backlight module according to claim 1, further comprising:
an insulating member disposed on the first surface or the second surface of the back plate, wherein the insulating member covers the metal portion.

8. The backlight module according to claim 7, wherein the insulating member further covers the second electrical connection pad.

9. The backlight module according to claim 1, wherein the driving circuit board further comprises an eighth electrical connection pad, a driving circuit and a circuit board, the driving circuit, the fifth electrical connection pad and the eighth electrical connection pad are disposed on the circuit board, and the eighth electrical connection pad is coupled to a ground terminal of the driving circuit.

10. The backlight module according to claim 1, wherein the light emitting unit further comprises a tenth electrical connection pad, a circuit board and at least one light emitting element, the light emitting element, the sixth electrical connection pad and the tenth electrical connection pad are disposed on the circuit board, and the tenth electrical connection pad is coupled to a ground terminal of the circuit board.

11. A display device, comprising:
a display panel; and
a backlight module disposed opposite to the display panel and comprises a back plate, a first electrical connection pad, a second electrical connection pad, a third electrical connection pad, a fourth electrical connection pad, a driving circuit board and a light emitting unit, wherein the back plate comprises a first surface and a second surface opposite to the first surface, the back plate comprises a metal portion and an insulating portion, and the insulating portion surrounds the metal portion, the first electrical connection pad, the second electrical connection pad, the third electrical connection pad and the fourth electrical connection pad are disposed in the insulating portion, the first electrical connection pad and the second electrical connection pad are disposed on the first surface of the back plate and are electrically coupled to each other through the metal portion, the third electrical connection pad and the fourth electrical connection pad are disposed on the second surface of the back plate, the first electrical connection pad is correspondingly coupled to the third electrical connection pad, the second electrical connection pad is correspondingly coupled to the fourth electrical connection pad, the driving circuit board is disposed on the first surface of the back plate and comprises a fifth electrical connection pad, the fifth electrical connection pad is correspondingly coupled to the first electrical connection pad, the light emitting unit is disposed on the second surface of the back plate and comprises a sixth electrical connection pad, wherein the sixth electrical connection pad is correspondingly coupled to the fourth electrical connection pad.

12. The display device according to claim 11, wherein the backlight module further comprises a seventh electrical connection pad disposed on the first surface of the back plate, wherein the back plate further comprises a grounding portion, the seventh electrical connection pad is disposed in the grounding portion, and the driving circuit board further comprises an eighth electrical connection pad which is correspondingly coupled to the seventh electrical connection pad and coupled to a ground terminal of the driving circuit board.

13. The display device according to claim 11, wherein the backlight module further comprises a ninth electrical connection pad disposed on the second surface of the back plate, wherein the back plate further comprises a grounding portion, the ninth electrical connection pad is disposed in the grounding portion, and the light emitting unit further comprises a tenth electrical connection pad which is correspondingly coupled to the ninth electrical connection pad and coupled to a ground terminal of a circuit board of the light emitting unit.

14. The display device according to claim 11, wherein the insulating portion surrounds the first electrical connection pad, the second electrical connection pad, the third electrical connection pad and the fourth electrical connection pad.

15. The display device according to claim 11, wherein the third electrical connection pad and the fourth electrical connection pad are electrically coupled to each other through the metal portion.

16. The display device according to claim 11, wherein the back plate further comprises a grounding portion, and the grounding portion and the metal portion are electrically insulated from each other through the insulating portion.

17. The display device according to claim 11, wherein the backlight module further comprises an insulating member, the insulating member is disposed on the first surface or the second surface of the back plate, and the insulating member covers the metal portion.

18. The display device according to claim 17, wherein the insulating member further covers the second electrical connection pad.

19. The display device according to claim 11, wherein the driving circuit board further comprises an eighth electrical connection pad, a driving circuit and a circuit board, the driving circuit, the fifth electrical connection pad and the eighth electrical connection pad are disposed on the circuit board, and the eighth electrical connection pad is coupled to a ground terminal of the driving circuit.

20. The display device according to claim 11, wherein the light emitting unit further comprises a tenth electrical connection pad, a circuit board and at least one light emitting element, the light emitting element, the sixth electrical connection pad and the tenth electrical connection pad are disposed on the circuit board, and the tenth electrical connection pad is coupled to a ground terminal of the circuit board.

* * * * *